W. H. DICKEY.
Millstone-Driver.
No. 221,796. Patented Nov. 18, 1879.
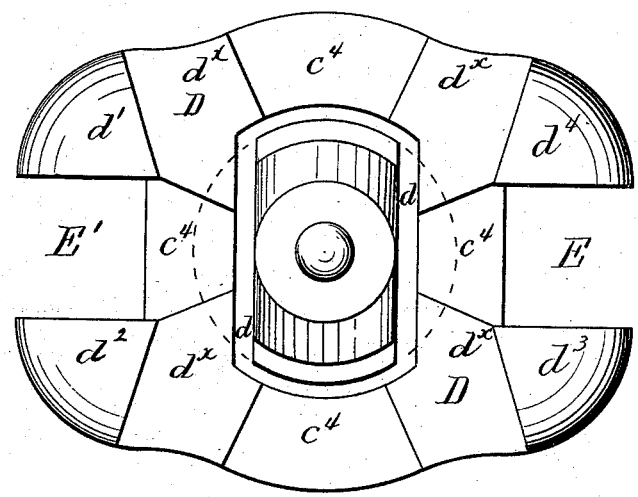
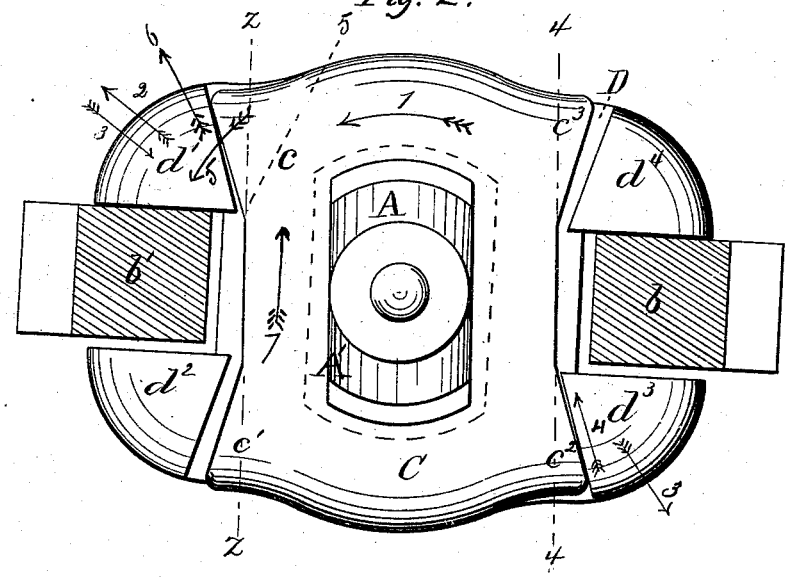
Witnesses:
H. N. Low.
H. H. Bliss
Inventor:
William H. Dickey
by H. H. Doubleday
atty 2 Sheets—Sheet 2.

W. H. DICKEY.
Millstone-Driver.

No. 221,796. Patented Nov. 18, 1879.

Witnesses:
H. N. Low.
H. H. Bliss

Inventor:
William H Dickey
by H H Doubleday atty

UNITED STATES PATENT OFFICE.

WILLIAM H. DICKEY, OF JACKSON, MICH., ASSIGNOR TO ALLEN BENNETT AND GEORGE S. BENNETT, OF SAME PLACE, ONE-THIRD TO EACH.

IMPROVEMENT IN MILLSTONE-DRIVERS.

Specification forming part of Letters Patent No. 221,796, dated November 18, 1879; application filed April 28, 1879.

*To all whom it may concern:*

Be it known that I, WILLIAM H. DICKEY, of Jackson, in the county of Jackson and State of Michigan, have invented certain new and useful Improvements in Millstone-Drivers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 3:
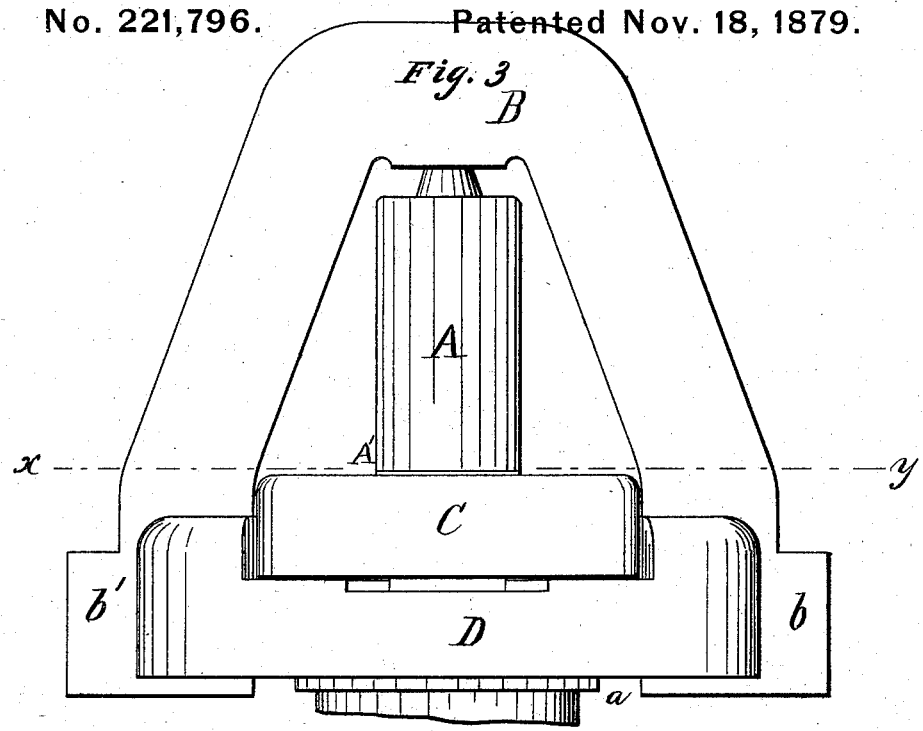
Figure 4:
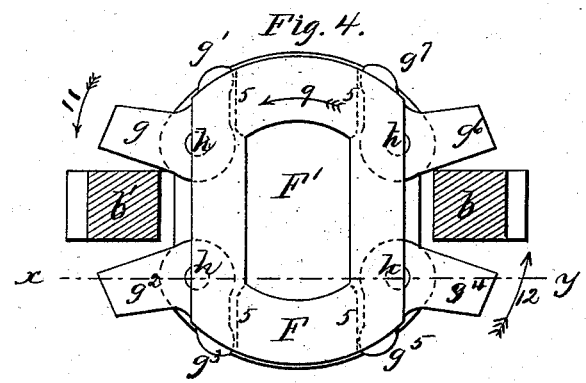
Figure 5:
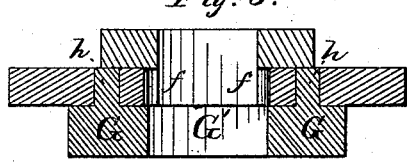

Figure 1 is a plan view of the spindle and the lower part of the driver. Fig. 2 is a top or plan view of the spindle and the driver complete, showing also the position of the heels of the bail to which the driver is applied. Fig. 3 is a side elevation of the bail and driver. Fig. 4 is a plan view of the modification of my invention. Fig. 5 is a vertical section taken on line $x\ y$, Fig. 4.

Referring to Figs. 1, 2, and 3, A represents the spindle, upon which the runner-stone is mounted and poised by means of the bail B, having heels $b\ b'$. The spindle is formed with a squared portion at $A'$, and is enlarged at $a$, so as to form a flange or shoulder, upon which the driver rests. The driver is constructed of two parts or members, the upper one, C, being provided centrally with an opening adapted to fit closely the squared portion $A'$ of the spindle. This upper portion is substantially square in outline, except that its corners are slightly beveled or angular, as at $c\ c'\ c^2\ c^3$, the lower face of the part C being substantially flat. The lower member, D, is substantially rectangular in plan, except that it is provided at its ends with recesses E E' to receive the heels $b\ b'$ of the bails. The upper face of the member D is recessed, as indicated in Figs. 1 and 3, in such manner as to leave upwardly-projecting lugs $d'\ d^2\ d^3\ d^4$, one of these lugs being located upon each side of the recesses E and E'.

The member D is provided centrally with an opening, $d$, of greater diameter in both directions than the diameter of the spindle, whereby freedom of motion of this member in any direction in a horizontal plane within certain limits is provided for. The part D is further recessed at $c^4$, for the purpose of leaving faces $d^\times$, which serve as rests or supports for the part C, the object of this construction being to reduce the friction of the part C upon the part D by reducing the amount of bearing-surface between them. When the driver is in proper position it rests upon the shoulder or flange $a$ of the spindle, and I usually prefer that the parts should be in the position shown in Fig. 3—that is to say, with the part C uppermost.

The operation of this construction shown in Figs. 1, 2, and 3 is substantially as follows: Suppose the spindle to be driven in the direction indicated by the arrow 1 in Fig. 2. If, when the driver commences to move, the lug $d'$ be in contact with the shoulder $c$ and with the heel $b'$ of the bail, but the lug $d^3$ be in contact with the shoulder $c^2$, but not with the heel $b$ of the bail, the result will be that the member D will be thrust in the direction indicated by the arrows 2 of Fig. 2—that is to say, on a line from right to left diagonally with the squared portion of the spindle.

From an examination of Fig. 2 it will be seen that the lugs $d'$ and $d^3$ form wedges, the engaging faces of which form angles corresponding substantially to the angle formed by the shoulder $c$ and the opposing face of the heel $b'$ of the bail, so that a slight movement of the lug $d'$ in the direction indicated by the arrow 2 permits the shoulder $c$ to approach more closely the heel $b'$, while at the same time there is a movement of the lug $d^3$, the engaging faces of which form an angle corresponding to the angle formed by the shoulder $c^2$ and the heel $b$ of the bail; hence a movement of this lug $d^3$ in the direction indicated by the arrow 4 closes up the space between the lug and the heel $b$ of the bail, this movement of lugs $d'\ d^3$ continuing until a contact is effected between all the working faces of these lugs, the part C of the driver and the heels of the bail thus equalizing perfectly the pressure of the driver upon both heels of the bail, as will be readily understood without further explanation; and it will be seen that if from any cause the stone runs for a moment faster than the spindle and driver a movement of these lugs in a substantially opposite direction (indicated by the arrows 3) will at once equalize the pressure of the bail upon the shoulders $c'$ and $c^3$, so that under no circumstances will the driver operate to disturb the balance of the stone.

It will be understood that in case the driver be employed for driving a stone which runs in the opposite direction—that is, with the sun—the lugs $d^2$ and $d^4$ will perform the same function of equalizing the pressure upon the heels of the bail.

I do not wish to be limited to this precise construction of parts, because, under some circumstances, I may prefer to form the shoulders $c$ and $c'$ in the same vertical plane—that is to say, upon the dotted line $z\ z$—and the shoulders $c^2\ c^3$ upon the dotted line 4 4, making a corresponding change in the form of the lugs $d'\ d^2\ d^3\ d^4$.

In Figs. 4 and 5 I have shown a modification of my invention, in which F is the upper member, provided with an opening, F', which fits tightly the squared portion of the spindle. The lower face of the part F is recessed upon opposite sides, as indicated by the dotted lines 5 in Fig. 4, and at $f$, Fig. 5. The lower member, G, rests upon the flange or shoulder $a$ of the spindle, (see Fig. 3,) and has a central opening, G', a little larger than the opening F' in the part F, so that the part G can move horizontally in all directions within certain limits, as can the part D in the construction shown in Figs. 1, 2, and 3.

$h\ h\ h\ h$ are pintle-studs rising from the upper face of the part G, and upon these pintle-studs are mounted four bell-crank levers, $g\ g'$, $g^2\ g^3, g^4\ g^5, g^6\ g^7$. The outer ends, $g\ g^2\ g^4\ g^6$, are adapted to engage with the heels $b\ b'$ of the bail and drive the stone, while the inner ends, $g'\ g^3\ g^5\ g^7$, engage with the vertical faces of the downwardly-projecting portion of the part F, which rests upon the upper face of the part G, as indicated in dotted lines 5, Fig. 4, and in full lines at $f\ f$ in Fig. 5.

The operation of the driver shown in Figs. 4 and 5 is substantially as follows: Suppose the spindle to be revolving in the direction indicated by the arrow 9, Fig. 4, and the end $g$ of the lever engages with the heel $b'$ of the bail before the corresponding arm $g^4$ engages with the opposite heel, $b$, of the bail, the result will be that the further rotation of the part F will move the part $g$ upon the line indicated by the arrow 11, by reason of the shoulder $f$ engaging with inner end, $g'$, of the bell-crank lever, which movement will cause the end $g^4$ of the lever at the opposite corner of the part G to move in the direction indicated by the arrow 12, by reason of the engagement of the heel or inner end of the bell-crank lever $g'$ with the shoulder $f$ of plate F until the end $g^5$ comes into contact with the heel $b$ of the bail, when the power will be applied uniformly to both heels of the bail, and the stone caused to revolve without having its balance disturbed by the driver; and it will be readily understood that in case the stone at any time revolves faster than the driver a reverse movement of the parts will take place until the ends $g^2$ and $g^6$ of the levers engage with opposite sides of the opposite heels of the bail with equal force.

Either of the above-described drivers may be used in the positions shown in the drawings, or they may be inverted—that is to say, with the parts C D and F G inverted.

In order to adapt my driver for use upon round spindles, it is only necessary to construct the central openings round in horizontal section instead of quadrangular, and provide them with key-seats, so that they may be keyed to the spindle.

From an examination of the drawings and the above description it will be seen that in both the constructions shown the operation and movements of the parts which take place in order to equalize the pressure upon opposite sides of the opposite horns of the bail are substantially the same—that is to say, in both constructions the lower floating part, D or G, moves upon a line drawn diagonally through the squared portion of the spindle, and that this diagonal motion of the lower members of both constructions is produced by the pressure upon the opposite sides of the bent levers in Figs. 4 and 5 and of the wedge-shaped lugs in Figs. 1, 2, and 3, the wedges and the lugs both being acted upon by the heels of the bail and the opposing vertical faces of the upper members of the drivers, it being apparent that the levers operate in substantially the same manner that the wedge-shaped lugs or projections would in case they (the lugs) were pivoted at their inner apexes to the part D.

I am aware that a driver has been used having a plate notched or recessed to receive the heels of the bail, the plate being so supported that it could reciprocate only upon a line at right angles to a line drawn through the spindle and the heels of the bail.

By examining Fig. 2 it will be seen, as the member C is driven in the direction indicated by the arrow 1, the shoulder of the corner $c$ is advanced toward the heel $b'$ of the bail, thus reducing the angle between these parts, and that when the triangular lug $d'$ is acted upon by these parts the natural tendency is to squeeze said lug outward in the direction indicated by the arrow 2; and in fact this result is produced in my driver, the construction of part D with a central opening of greater diameter in both directions than the diameter of the spindle permitting such movement to take place with but little friction, whereas, if the construction of parts were such that the member D, carrying lug $d'$, could move only in the direction indicated by arrow 7, the adjustment of parts would be very difficult, owing to this fact, among others, that the movement of the member D (see arrow 7) must be in a direction almost the reverse of the direction in which the power is applied. (See arrow 5.) In fact I have learned that under ordinary circumstances a driver in which the vibrating member can reciprocate only on the line indicated by the arrow 5 will not equalize the pressure upon both heels of the bail, but will drive by one bail only.

What I claim is—

1. In a millstone-driver, a plate provided with jaws adapted to engage with the bail of the stone to be driven, with a central opening of greater dimensions in both directions than the diameter of the spindle in cross-section at the point to be occupied by the plate, and provided at diagonally-opposite corners with lugs or blocks projecting from its horizontal face, in combination with a driving-plate firmly secured to the spindle and interposed between the projecting parts, substantially as set forth.

2. In a millstone-driver, the part G, having the bent levers pivoted upon diagonally-opposite corners, and provided with a central opening of greater diameter than the diameter of the squared portion of the spindle in cross-section, in combination with the plate F, rigidly attached to the stone and engaging with the inner ends of the bent levers, substantially as set forth.

In testimony that I claim the foregoing as my own I affix my signature in presence of two witnesses.

WM. H. DICKEY.

Witnesses:
E. W. ROCKWELL,
GEO. S. BENNETT.